United States Patent [19]

Rowe

[11] Patent Number: 4,612,447

[45] Date of Patent: Sep. 16, 1986

[54] METHOD AND APPARATUS FOR CONVERTING HUMAN EXERCISE ENERGY TO STORED KINETIC ENERGY

[76] Inventor: Eugene T. Rowe, 314 Colonel Dr., Highland Springs, Va. 23075

[21] Appl. No.: 529,912

[22] Filed: Sep. 7, 1983

[51] Int. Cl.⁴ ............................................. F03G 5/06
[52] U.S. Cl. .................................... 290/1 R; 290/54
[58] Field of Search ............... 290/50, 1 R, 1 A, 43, 290/54; 417/229-231, 236-237, 903; 310/75 B; 415/122 R, 124

[56] References Cited

U.S. PATENT DOCUMENTS

| 735,628 | 8/1903 | Waxel | 417/230 |
| 3,240,947 | 3/1966 | Mas | 290/50 |

FOREIGN PATENT DOCUMENTS

| 2365890 | 5/1978 | France | 290/1 R |
| 120196 | 11/1947 | Sweden | 417/229 |

Primary Examiner—William M. Shoop, Jr.
Assistant Examiner—W. E. Duncanson, Jr.
Attorney, Agent, or Firm—Jim Zegeer

[57] ABSTRACT

Exercise method and apparatus activated air compressor driven by a pedal and crank exercise machine which is used for supplying kinetic energy to drive an air compressor. The compressed air is stored in a series of compressed air bottles similar to those used in scuba diving, the compressor being connected to the air storage bottles in sequentially switched fashion as each bottle reaches a desired predetermined pressure. The kinetic energy thus stored in the bottles in the form of high pressure air is released at a controlled rate to drive a turbine, for example, or any form of the air motor, which may then in turn drive any electrical generator, or supply a source of rotary power for any use.

3 Claims, 1 Drawing Figure

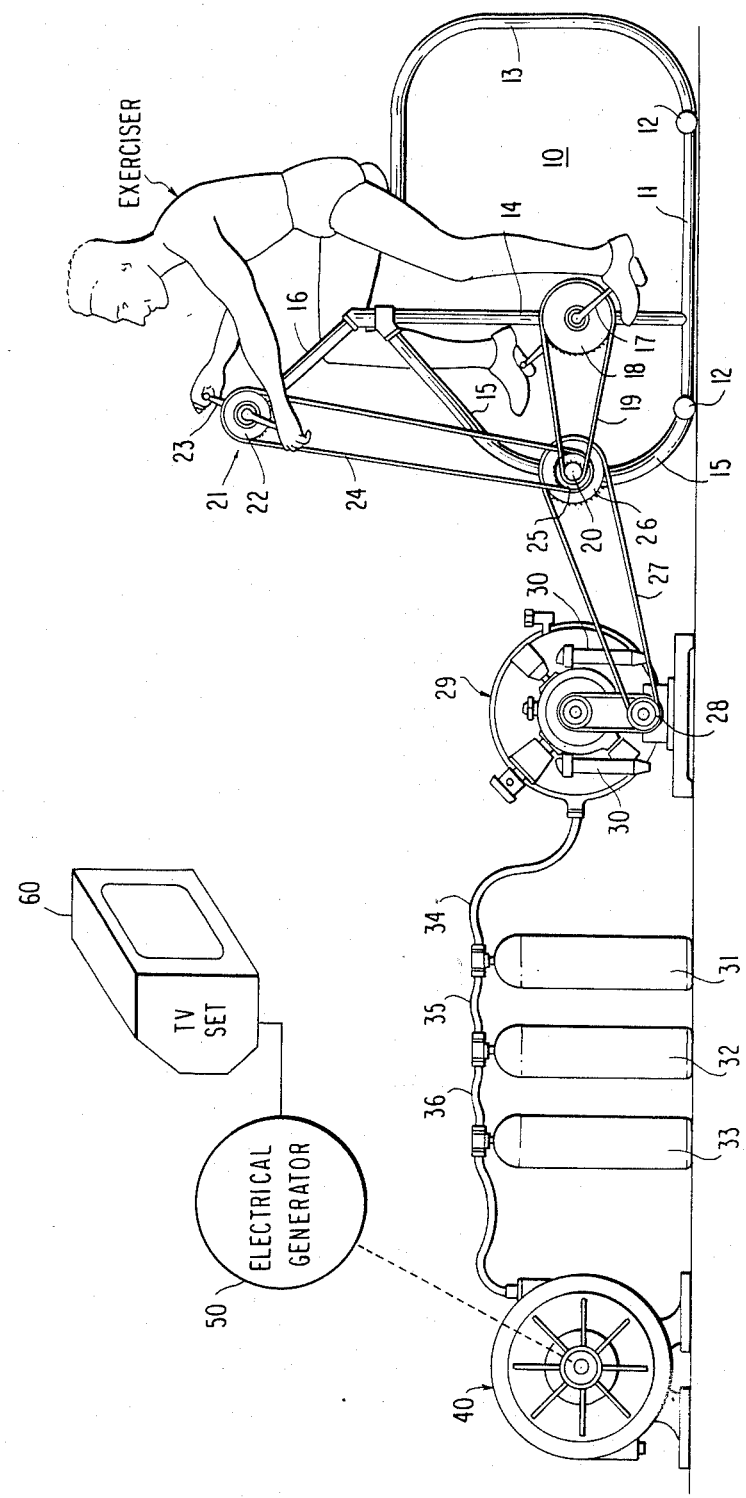

METHOD AND APPARATUS FOR CONVERTING HUMAN EXERCISE ENERGY TO STORED KINETIC ENERGY

BACKGROUND OF THE INVENTION

Use of compressed air stored in storage chambers for driving a turbine coupled to an electrical generator is disclosed in U.S. Pat. No. 2,994,785. The use of human pedal power from stationary bicycles for driving the electrical generators directly is likewise well known as disclosed in U.S. Pat. Nos. 3,240,947 and 3,377,505. Compressed air stored in tanks for subsequent use in driving an electrical generator is shown in Vuell U.S. Pat. No. 344,344. However, according to the present invention, the energy storage system based on using compressed air as a storage medium uses an exercise machine which, in the preferred embodiment, exercises all major portions of the human body, the legs, arms and torso, to drive an air compressor that generates the compressed air. A plurality of high pressure air storage cylinders or tanks are sequentially coupled to the compressor and filled to predetermined air pressure then the air that is stored is used to power or drive an air motor for generating electric energy for use or to supply a source of rotary power.

A study has shown that the efficiency of the exercise machine/compressor will be approximately 60% and it is estimated that the average exerciser will produce 0.2 horsepower which equals 66 hundred ft.-lb./min. Thus, to compress 70 cubic feet of air to 2250 lbs. per square inch will require about 191 minutes so if an average person exercises on the machine for an average of 30 minutes per day, approximately 6 days would be required to fill the cylinder. Obviously, this would vary as a function of the determination of the exerciser and the number of them in the family. If the tank size was changed to 240 cubic feet and at 3000 lbs. per square inch, the work and time would be 4,582,005 ft./lbs. and the time would require 22 days at the same rate of exercise to fill the tank.

The air stored in the tank can be used to drive an air motor and to drive an electrical generator for example.

In a preferred embodiment, the compressor is designed to match the human driving force, and has low velocity seals, and the exercise machine uses both arms and legs of the exerciser for energy input and maximum health benefit.

BRIEF DESCRIPTION OF THE DRAWING

The above and other objects, advantages and features of the invention will become more apparent when considered with the following specification and accompanying drawing which is a schematic illustration of an exercise machine incorporating the invention.

DETAILED DESCRIPTION OF THE INVENTION

As shown in the drawing, a stationary exercise machine 10 has a platform 11 with laterally extending support members 12, seat member 13, crank post 14, transmission member 15, and hand-crank member 16. Pedal crank assembly 17 is mounted in bearings (not shown) on crank post 14 with a sprocket 18 coupled through a sprocket chain 19 to small gear 10 mounted on gear member 15. Hand crank assembly 21 has a sprocket 22 driven by hand cranks 23 and coupled by a sprocket chain 24 to gear 25 which is secured to gear 20 so that the effect of the exerciser E in pedaling with arrow crank assembly 17 and sprocket 18 driving small gear is cumulative with the driving energy delivered through and cranks 23 to gear 22 and thats to gear 25. A flywheel (now shown) may be used to provide short rest intervals for the exerciser and continuous air flow to the storage cylinders. These gears are coupled by a further sprocket 26 and chains 27 to a drive sprocket 28 which, in turn drives an air compressor 29. Various forms of foot and hand crank assemblies can be used in the practice of the invention. See "Pedal Power" by James C. McCullagh, Rodale Press 1977, incorporated herein by reference.

Air compressor 29 is a four stage air compressor which has an automatic drainage system 30 and air purification system (not shown) and may, for example, be of the type manufactured and sold by Bauer Compressors, Inc. of Norfolk, Va. The air from the compressor and drainage and purification system is supplied to a plurality of air bottles 31, 32 and 33 by tubing assemblies 34, 35 and 36, the filling arrangement being of known type where the first bottle is filled to a predetermined pressure and then the second bottle and each suceeding bottle 32, 33, et seq is filled to its predetermined safe pressure. It will be appreciated that various size, shape pressure capacity, and number of air vessels or storage bottles may be used. As noted, the air from these storage bottles may be connected to the compressor 29 either in series or in parallel and may be supplied to a load device in series or in parallel. In the present embodiment, they are delivered into an air motor 40, the type shown in the drawing being a vane type air motor but may be any type of air motor as manufactured by various manufacturers, such as Gast Manufacturing Corporation of Benton Harbor, Mich., Pneumotive of Monroe, La., and ITT Tech Development Inc. of Dayton, Ohio, Tachyon Corporation of Minneapolis, Minn., and Atlas Copco.

Air motors are safe, reliable, resist heat, moisture acid, etc. and they generate no sparks so they can be used in explosive atmospheres without risk and they have variable speed regulator from 0 to full speed and are relatively inexpensive.

While I have shown and described my invention in a particular embodiment, it will be appreciated that various modifications and adaptations can be made without departing from the spirit and scope of the invention as defined in the appended claims.

What is claimed is:

1. Apparatus for storing normally uselessly dissipated human energy and converting the stored energy to a useful energy form comprising, a human operatable crank means and shaft rotated thereby, an air compressor means operated by said shaft, a plurality of high pressure air storage vessels connected to said air compressor, and means for sequentially connecting each said high pressure air storage vessel to said air compressor to sequentially fill each high pressure air storage vessel with air from said air compressor to a selected storage pressure, air motor means connected to said high pressure air storage vessels, and means for connecting each filled said high pressure storage vessel in sequence to said air motor means to supply high pressure air thereto, each succeeding of said high pressure air storage vessels which is filled being connected to said air motor means automatically upon the pressure of a preceeding high pressure air storage vessel reaching a predetermined low pressure.

2. The invention defined in claim 1 wherein said human operatable crank means and shaft rotated thereby include foot operated pedals and a hand operated crank means and further shaft rotated thereby, and means for coupling rotary movement of said hand operated crank and further shaft to said air compressor.

3. The invention defined in claim 1 wherein said air compressor is adapted to sequentially deliver a low volume of air at high pressure to said storage vessels, respectively.

* * * * *